J. E. KOEBERLE.
HEADLIGHT.
APPLICATION FILED JULY 23, 1908. RENEWED MAR. 19, 1912.

1,033,070.

Patented July 16, 1912.

Witnesses:
David Wellman
Antonio M. Orrien

Inventor:
J. E. Koeberle,
By
Atty

UNITED STATES PATENT OFFICE.

JOHN EUGENE KOEBERLE, OF LOS ANGELES, CALIFORNIA.

HEADLIGHT.

1,033,070.  Specification of Letters Patent.  Patented July 16, 1912.

Application filed July 23, 1908, Serial No. 445,430. Renewed March 19, 1912. Serial No. 684,810.

*To all whom it may concern:*

Be it known that I, JOHN EUGENE KOEBERLE, of the city of Los Angeles, in the county of Los Angeles and State of California, have invented new and useful Improvements in Headlights, of which the following is a full, clear, and exact specification, reference being had to the annexed drawings and to the letters and figures marked thereon.

My invention relates to certain new and useful improvements in headlights, applicable for use on automobiles or other vehicles while it is also applicable for use on locomobile engines.

The object of my invention is to provide a headlight so constructed that the illumination therefrom may be spread outwardly therefrom in such a direction that the street will be illuminated throughout its entire width, so that the vehicle carrying it will illuminate the street into which it is about to turn before reaching the corner, and also whereby the driver may be enabled to give a warning as to the direction of the turn.

A further feature of this invention consists in providing illuminating means, one in connection with the center light, or both of the side lights, whereby the driver may be able to signal a colored light or lights from the two side lights or from either side, or by means of which a portion of the light from the main light may be reflected through different colored lights in or through the side projections of the apparatus. This means of advance signaling by a red or other colored light affords not only considerable safety for all kinds of vehicles and pedestrians, but it is also of considerable advantage for use with automobile fire apparatus, and the like.

Figure 1:
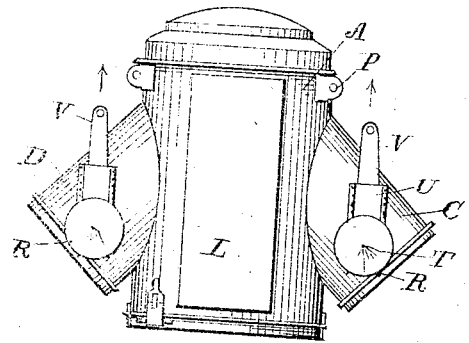
Figure 3:
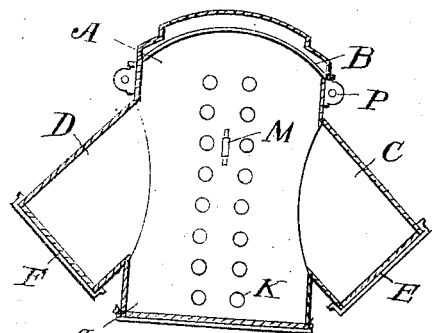
Figure 2:
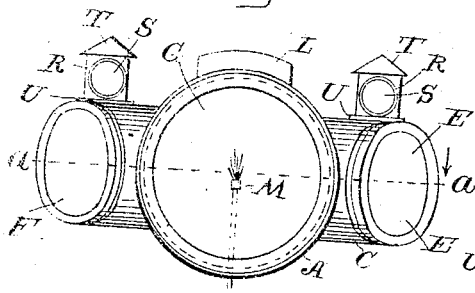
Figure 4:
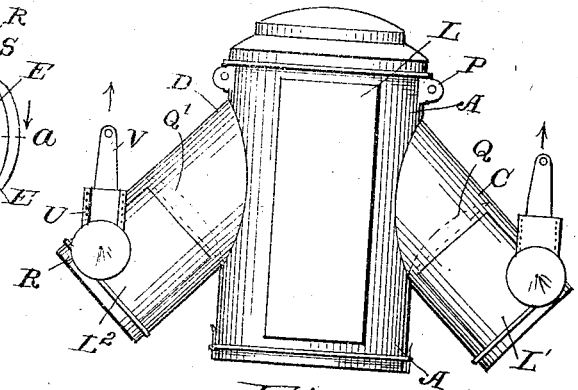
Figure 6:
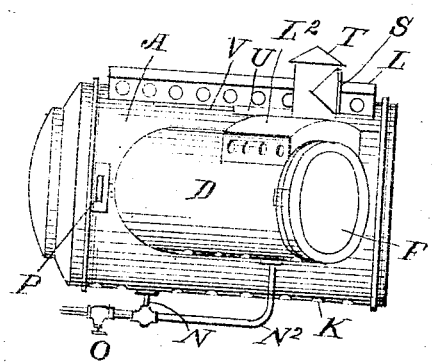
Figure 5:
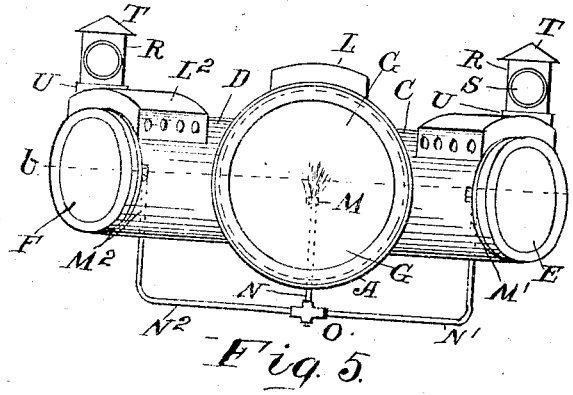

In the accompanying drawings, Figure 1 is a plan of the headlight showing the danger signal lamps on the sides of the main light. Fig. 2 is a front elevation of the head light, showing the main light in the center and the two side lights. Fig. 3 is a horizontal section thereof on line *a—a*, of Fig. 1. Fig. 4 is a plan of the modification of the headlight shown in Fig. 1. Fig. 5 is a front elevation corresponding to Fig. 4, showing the danger signal lamps; and, Fig. 6 is a side elevation corresponding to Figs. 4 and 5.

In the headlights shown at Figs. 1, 2 and 3, which is used as a single and central headlight, the device consists of the cylindrical central portion A, in the rear of which is a reflector B, as shown at Fig. 3, fitted therein in the usual manner. From each side of this cylindrical portion, and projecting at an angle, are the tubes C, D, which may have plain or red and green glasses respectively, in either case of which the light rays from the reflector B in the main casing, issues at angles through these side lights as colored rays, and therefore different from the white light issuing from the glass G of the central cylindrical portion A. Either of these arrangements of the colors of the glasses in the angularly situated tubes C, D, produces the rays of light so effectively in comparison with the white light, that warning is thereby given to pedestrians or other drivers by these side lights.

By providing the headlight with special danger signals in addition to the side lights I enable the driver to illuminate a danger signal at any point in the course of the vehicle, and at any required distance before arriving at the point wherein he intends to turn.

The casing of the headlight is constructed with perforations K in the bottom thereof, by which air passes upward into the ventilator L at the top thereof. The illuminating agent used in the headlight may be either oil or other suitable illuminating medium, such as acetylene, which is conveyed to the burner M through the pipe N, and a stop cock O is provided to regulate the flow of the illuminant. Either electric, incandescent, or arc light may be used in the casing. The casing is also provided with lugs P having holes as shown, which are used for fastening to the vehicle.

The various figures show danger signal lamps R, which project up vertically from the outer end of each of the side tubes C, D. Each of these danger signal lamps has mounted within it a brilliantly red lens S, commonly called a bull's-eye, which projects light admitted through it from the interior of each lamp R directly toward and immediately above each of the side lights E, F.

Each lamp R, has fastened to it at the top, a ventilator T, and the bottom of each lamp is fastened to a casing U which being, preferably, flat admits of a sliding screen plate V, which slides therein, thus shutting the light from shining through any of the bull's-eyes S, and which when opened by the driver, on being pulled backward in the direction of the arrows, shown in Figs. 1 and 4, admits the light from the body of the lamp, that is to say, from either of the tubes C, D, up into the lamp R, so as to shine through each red bull's-eye, thereby giving a danger signal.

Each of the glasses E and F in the side lights C, D, respectively, in Figs. 4, 5 and 6, is provided with a separate reflector Q, Q'. The side lights C, D, are also provided with burners M' and M², corresponding with the single burner M, for illuminating the central part of the headlight.

For the purpose of illuminating the headlights, as last described, the central pipe N, corresponding with the pipe N in Fig. 2, is provided with two branches N' and N², respectively, which lead to the burners M', M², in each of the sidelights, as shown at Figs. 5 and 6, and a stop cock O, as shown at Fig. 6, serves the purpose of regulating the flow of the illuminant to each of the burners.

What I claim as new, is:—

1. A headlight, comprising a cylindrical casing having a tubular portion extending at an angle horizontally from one side of said cylindrical casing, said casing having a reflector at its rear, and a glass in the cylindrical casing and tubular portion respectively, through which light of the illuminant is reflected as a luminous beam directly ahead, and also light at an angle as another luminous beam, a danger signal lamp, on each lateral tubular extension, each tubular extension having an opening below the signal lamp to admit light from said tubular extension, a burner for the illuminant, and a valve or cock for regulating the supply of the illuminant to the burner.

2. A headlight, comprising a cylindrical casing, having a tubular portion extending at an angle horizontally from one side of the cylindrical casing, said casing having a reflector at its rear, and a glass in the cylindrical casing and tubular portions respectively, through which the light of the illuminant used is reflected as a luminous beam directly ahead, and also at an angle as another luminous beam, a danger signal lamp on top of the tubular extension, said extension having an opening to receive light from said tubular extension, a slide or shutter for throwing on or off the light, a burner for the illuminant, and a valve for regulating the fuel supply.

In testimony whereof, I have hereunto set my hand and seal at the city of Los Angeles, aforesaid, in the presence of two subscribing witnesses.

JOHN EUGENE KOEBERLE. [L. S.]

Witnesses:
St. John Day,
J. D. Cory.